United States Patent [19]

Hayes et al.

[11] Patent Number: 5,107,457
[45] Date of Patent: Apr. 21, 1992

[54] STACK DATA CACHE HAVING A STACK MANAGEMENT HARDWARE WITH INTERNAL AND EXTERNAL STACK POINTERS AND BUFFERS FOR HANDLING UNDERFLOW AND OVERFLOW STACK

[75] Inventors: John R. Hayes, Laurel; Susan C. Lee, Columbia, both of Md.

[73] Assignee: The Johns Hopkins University, Baltimore, Md.

[21] Appl. No.: 331,718

[22] Filed: Apr. 3, 1989

[51] Int. Cl.$^5$ ............................................. G06F 9/06
[52] U.S. Cl. .................................. 395/800; 364/239;
364/239.6; 364/244.3; 364/247; 364/247.7;
364/254.5; 364/251; 364/251.3; 364/933;
364/933.6; 364/955; 364/957.6; 364/965;
364/965.4; 364/DIG. 1; 364/DIG. 2

[58] Field of Search ... 364/200 MS File, 900 MS File

[56] References Cited

U.S. PATENT DOCUMENTS

| | | | |
|---|---|---|---|
| 3,786,432 | 1/1974 | Woods | 364/200 |
| 3,889,243 | 6/1975 | Drimak | 364/200 |
| 3,909,797 | 9/1975 | Goss et al. | 364/200 |
| 4,240,137 | 12/1980 | Matsumoto et al. | 364/200 |
| 4,334,269 | 6/1982 | Shibasaki et al. | 364/200 |
| 4,524,416 | 6/1985 | Stanley et al. | 364/200 |
| 4,532,587 | 7/1985 | Roskell et al. | 364/200 |
| 4,807,185 | 2/1989 | Kamiya | 364/900 |
| 4,835,738 | 5/1989 | Niehaus et al. | 364/900 |
| 4,969,091 | 11/1990 | Muller | 364/200 |

OTHER PUBLICATIONS

Kruse; "Data Structure and Program Design", Chapter 2; 1984 by Prentice-Hall, Inc.; pp. 41-63.

The Mechanization of a Push-Down Stack, written by C. B. Carlson (AFIPS Conf. Proc., V. 24, 1963).
Exploring a Stack Architecture, written by Russel P. Blake (IEEE Computer, 10, 5, May 1977).
Register Allocation for Free: The C Machine Stack Cache, written by David R. Ditzel and H. R. McLellan (Proc. Symposium on Architectural Support for Programming Languages and Operating Systems, Mar. 1982).
Strategies for Managing the Register File in RISC, written by Yuval Tamir and Carlo H. Sequin (IEEE Transection on Computers, vol. C-32, No. 11, Nov. 1983).
Sun Builds an Open RISC Architecture, by Robert B. Garner (Sun Technology, Summer 1988).
High-Speed Top-of-Stack Scheme for VLSI Processor, by M. Hasegawa and Y. Shigei (Proc. of the 12th Annual International Symposium on Computer Architecture, pp. 48-54, 1985).

*Primary Examiner*—Thomas C. Lee
*Assistant Examiner*—Krisna Lim
*Attorney, Agent, or Firm*—Robert E. Archibald; Howard W. Califano; Eugene J. Pawlikowski

[57] ABSTRACT

An efficient hardware cache manager controls the top-of-stack data underflow/overflow. A processor chip includes a processor, a stack buffer and the invented cache management hardware. The processor chip communicates with a remove overflow stack through an address/data bus. The cache management hardware efficiently manages overflow and underflow to and from the processor chip in such a manner less than 1% of the processor's time is spent managing the stack cache.

3 Claims, 4 Drawing Sheets

Push/Pop Operation Flow Chart

STACK DATA CACHE HAVING A STACK MANAGEMENT HARDWARE WITH INTERNAL AND EXTERNAL STACK POINTERS AND BUFFERS FOR HANDLING UNDERFLOW AND OVERFLOW STACK

STATEMENT OF GOVERNMENTAL INTEREST

The Government has rights in this invention pursuant to Contract No. N00039-87-C-5301 awarded by the Department of the Navy.

BACKGROUND OF THE INVENTION

1. Field of the Invention

This invention relates to an apparatus for effectively transferring overflow/underflow data from a stack buffer to an external overflow stack.

2. Description of Prior or Contemporary Art

Computer designers have for years attempted to use a rapidly accessible buffer or stack cache that is associated with a slower or more remote main memory. An article entitled "The Mechanization of a Push-down Stack", written by C. B. Carlson (AFIPS Conf. Proc., V. 24, 1963), describes an early Burroughs machine that places the top two elements of a stack in machine registers with the rest in main memory. Similarly, an early article by Russell P. Blake entitled "Exploring a Stack Architecture" (IEEE Computer, 10, 5, May 1977) describes the buffer stack arrangement in the early HP 3000 computer system.

More recently attempts have been made to optimize cache management for the C-language, a general purpose computing language. An article entitled "Register Allocation for Free: The C Machine Stack Cache", written by D. R. Ditzel and H. R. McLellan (Proc. Symposium on Architectural Support for Programming Languages and Operating Systems, March, 1982) describes a cache management scheme that allocates a stack frame in the cache memory. The size of the frame is determined by the number of registers necessary to perform a particular procedure. The number/register written out of or into the cache is determined by the space needed for the procedure frame. An article entitled "Strategies for Managing the Register file in RISC" written by Y. Tamir and C. H. Séquin (IEEE Transection on Computers, Vol. C-32, No. 11, November 1983) describes a RISC (reduced instruction set computer) architecture utilizing a cache arrangement in which a register window is set up for each procedure. The output from one procedure becomes the input of a called procedure through overlapping register window. When overflow or underflow occurs, an entire register window (comprised of 16 registers) is written out of or into the stack cache. An article entitled "Sun Builds an Open RISC Architecture" by Robert B. Garner (Sun Technology, Summer 1988) describes the implementation of the same RISC cache management scheme in a commercial processor chip. Again, the single processor chip embodiment transfers fixed windows comprising multiple register values with each overflow or underflow.

An article entitled "High Speed Top-of-Stack Scheme for VLSI Processor" by M. Hasegawa and Y. Shigei (Proc. of the 12th Annual International Symposium on Computer Architecture, pp. 48-54, 1985) is a theoretical study of a cache stack to determine the optimum management scheme. The article assumes that stack depth is a random walk function. Applicants have shown this assumption to be false and have found that the cache depth reaches a particular value and then proceeds to oscillate slightly around that value. As a result, the optimum cache stack management scheme suggested by the above article differs from the scheme described in this patent application.

SUMMARY OF THE INVENTION

The present invention teaches an efficient means for transferring overflow/underflow data between a stack buffer located on the processor chip and an external overflow stack. This efficient stack management hardware results from the inventors' discovery that only transferring data stored in one register to or from the external stack, with each overflow/underflow occurrence, is more efficient than transferring a block of data contained in several registers.

A processor, such as a RISC processor, is located with the stack buffer on a processor chip. A single address/data bus connects the processor chip to the external overflow stack, thereby reducing the pin count for the processor chip. The processor generally must fetch a new instruction every clock cycle. Since there is only a single path between the processor and external memory, the overflow/underflow operations must stall instruction fetches and, consequently, instruction execution. During these stalls, the processor is not making any progress on the program it is trying to run. The overhead for managing the stack cache is the number of processor cycles spent overflowing and underflowing divided by the total number of processor cycles. The present invention is a cache and management hardware means that reduces this overhead.

The invention generally comprises: an on-chip stack buffer having a plurality of locations addressed by a pointer; an external overflow buffer having a plurality of locations addressed by an external buffer pointer; a counter means for incrementing or decrementing the stack pointer, wherein a push of data onto the stack buffer will increment the stack pointer and a pop of data from the stack buffer will decrement the stack pointer; and, a stack management hardware means for: (1) comparing the stack pointer with an overflow pointer and an underflow pointer to determine if underflow or overflow has occurred; (2) incrementing the overflow/underflow pointers by one, and writing into the external overflow buffer a single element stored in the stack buffer, one location past the location addressed by the stack pointer, if overflow has occurred, and (3) writing an element stored at the top of the external overflow buffer into the stack buffer at a location a set number of locations below the stack pointer, decrementing the overflow and underflow pointer one location and incrementing the external stack buffer pointer, if underflow has occurred.

The resulting cache management hardware handles overflow and underflow in such a manner that less than 1% of the processor's time is spent managing the stack cache. This is a very low (almost negligible) overhead and a small price to pay for an on-chip stack cache that communicates with an external overflow stack through a single address bus. The cache management hardware also allows the distance between the overflow and underflow pointers to be pre-set, thereby guaranteeing that a certain number of registers in the stack buffer always contain current data.

DESCRIPTION OF THE PREFERRED EMBODIMENT

Figure 1:
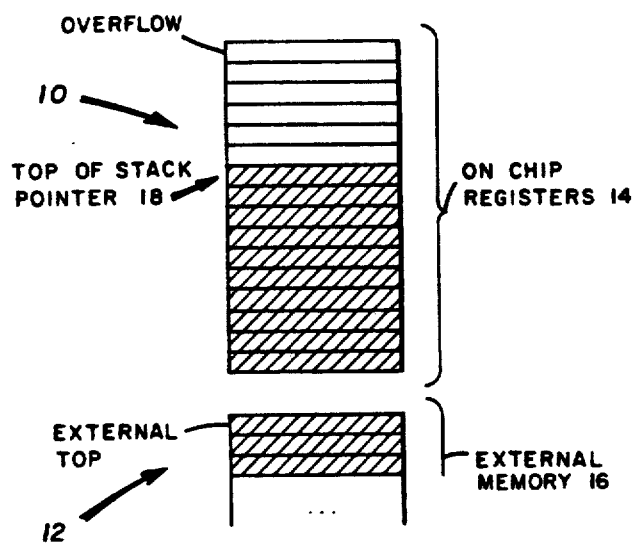
FIG. 1 is a diagrammatic view of the present invention showing both on-chip registers and external stack buffers.

FIG. 1 shows a diagrammatic view of a stack buffer 10 that is located on the same integrated circuit chip with a processor. The processor chip connects to an external memory 12 (or an external overflow buffer). Since the same external memory is used to hold overflow from the on-chip stack buffer, as well as the processor's programs and data, only a single address/data bus (not shown), is needed to connect the external memory to the processor chip. This is significant because it reduces the pin count of the processor chip. The invented stack management hardware keeps the top portion of the stack in the on-chip registers 14 with the remainder of the stack kept in the external memory 16. As the contents of the on-chip stack buffer grows and shrinks, the top of the stack pointer 18 moves up and down within the registers. If the registers fill, then the cache management hardware intervenes to push one of the register values onto the external overflow stack. Similarly, when the on-chip registers are almost empty, a value from the external stack is popped into an on-chip stack register.

Figure 2:
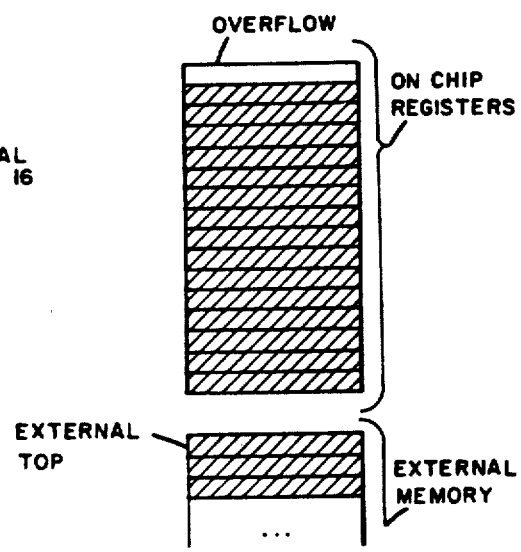
FIG. 2 is a diagrammatic view of a cache stack just prior to an overflow condition.

FIG. 2 shows the on-chip stack buffer on the verge of overflow. If an additional instruction pushes data onto the stack, the instruction is completed and then the special stack management hardware (discussed in detail later) takes over. The value in the bottom most register in FIG. 2 is then pushed onto the external stack by decrementing the external overflow buffer pointer and storing the register value at this address. Then the freed register is reallocated to the top of the on-chip stack buffer to allow for future stack growth. Finally, the overflow and underflow markers are moved up one register location. For stack buffer underflow, a similar and symmetric operation is done. The entire overflow (or underflow) operation takes two clock cycles in the current chip implementation.

Generally processors, such as RISC processors, must fetch a new instruction every clock cycle. Since there is only a single path between the processor and memory, the overflow and underflow operations must stall instruction fetches, and consequently, instruction execution. During these stalls, the processor is not making any progress on the program it is trying to run. The overhead for managing a stack cache is the number of processor cycles spent overflowing and underflowing divided by the total number of processor cycles. The key to the present invention was to design a cache management hardware which reduced this overhead.

The most intuitive step to reduce cache overhead would be to transfer a block of data (containing several register values) from the on-chip buffer to the external overflow buffer during the same overflow cycle; and, similarly, to transfer a block (containing several register values) back to the buffer stack during underflow. However, that intuitive assumption proved to be totally wrong. The inventors discovered that transferring only one register value during overflow (or underflow) actually resulted in reduced cache overhead.

Figure 3:
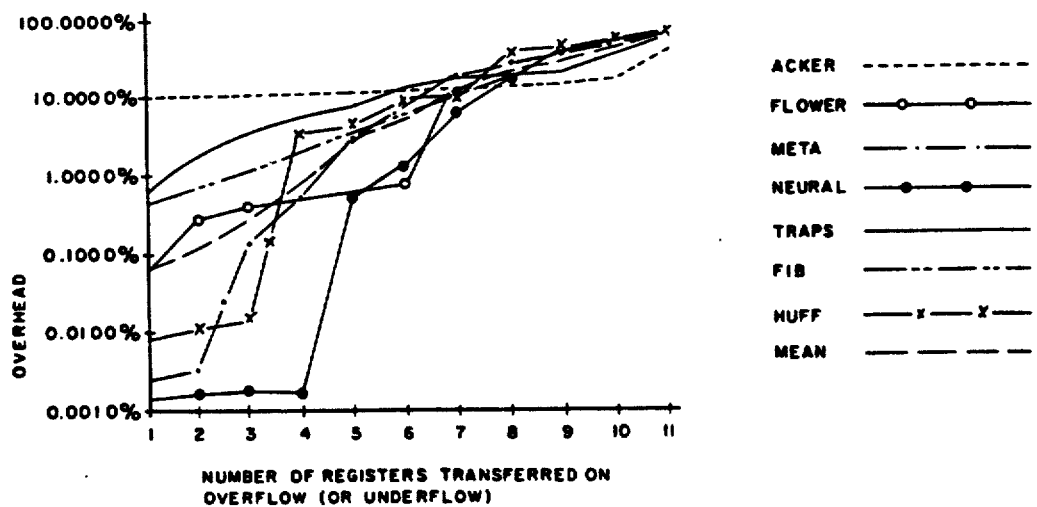
FIG. 3 is a graph showing the effect in processor overhead for a given number of transfers during overflow or underflow.

The result of simulation runs demonstrating this discovery is shown in FIG. 3. A collection of the following Forth language programs were used:

| | |
|---|---|
| flower | A graphics program drawing a complex geometric figure. |
| meta | The (meta) compilation of a new Forth system. |
| neural | A back propagation neural network simulation of learning. |
| traps | A 50 rule expert system for spacecraft trajectory preprocessing. |
| huff | Huffman encode a text file. |
| fib | Recursively compute the 24th Fibonacci number. |
| acker | Recursive Ackerman's function. |

To generate FIG. 3, the first one million primitives of each program were traced except for "acker" and "flower" which were shorter programs. Each of these simulations were rerun several times, each time with a different number of items initially on the stacks. FIG. 3 is graph of each simulation with the worst case overhead value shown on the abscissa and the number of registers transferred on overflow (or underflow) on the ordinate. FIG. 3 surprisingly shows that for a hardware cache manager the best number of registers to write out on overflow is one.

Figure 4:
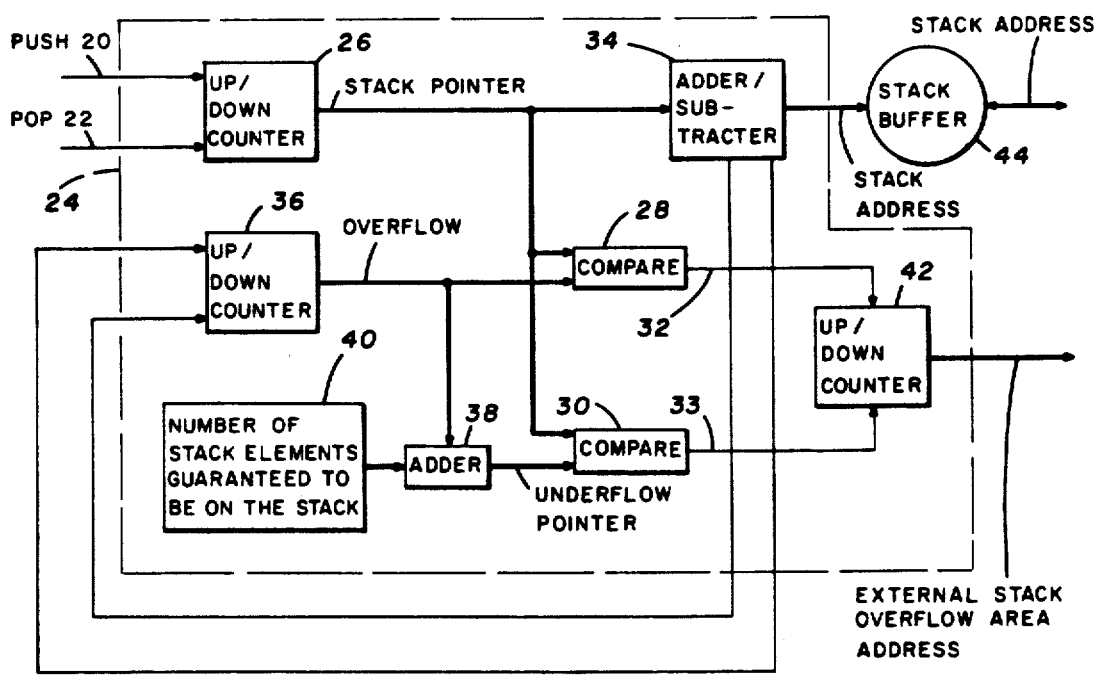
FIG. 4 is a block diagram of the cache management hardware.

FIG. 4 shows a block diagram of the cache stack management hardware. Although the diagram shows a single stack buffer, it is to be understood that two or more stack buffers could be resident on the same chip and still communicate with the external buffer through a single address bus. As seen in FIG. 4, a push 20 or pop 22 command sent by the processor to the on-board stack management hardware 24, activates an up/down counter 26 which increments or decrements the stack pointer. The stack pointer value is then input to two compare circuits 28, 30. If the stack pointer equals the overflow pointer compare circuit 28 would provide an overflow indication 32. If the stack pointer equals the underflow pointer compare circuit 30 would generate an underflow indication 33.

If the overflow indication 32 is indicated, the adder/subtracter 34 selects the element to the be written, the up/down counter 36 increments the overflow pointer and adder 38 calculates the underflow pointer and also keeps the underflow pointer a set number of stack elements from the overflow pointer (a constant equal to the number of stack elements guaranteed to be on the stack is stored in memory 40), and updown counter 42 is decremented and a single element stored in the stack buffer 44 is written into the external overflow buffer (not shown). If, however, the underflow indication 33 is indicated, the adder/subtracter 34 selects the stack location number to be written, up/down counter 36 decrements the overflow pointer and adder 38 calculates a new underflow pointer and keeps the underflow pointer a certain number of stack elements from the overflow pointer and updown counter 42 is incremented and a single element stored in the external overflow buffer is transferred for storage into the stack buffer 44.

Figure 5A:
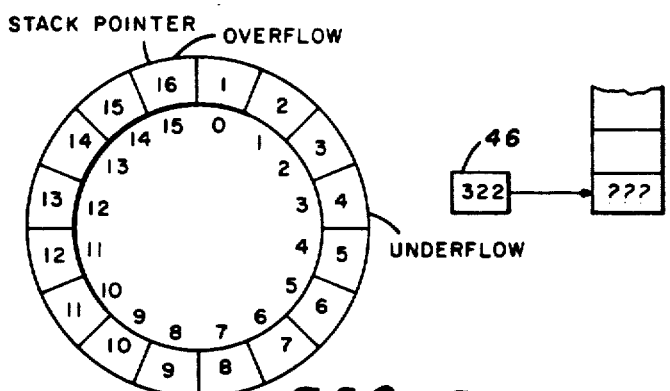
FIGS. 5a, 5b and 5c are diagrammatic views of the cache stack during overflow.
Figure 5B:
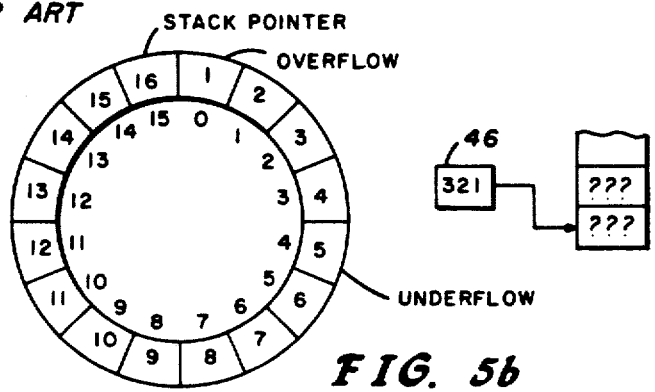
Figure 5C:
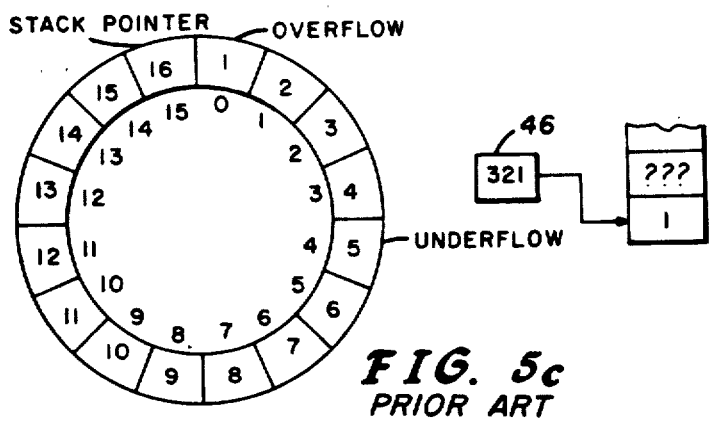

FIG. 5 illustrates the operation of the stack cache during an overflow condition. In FIG. 5a, the value "16" has been pushed onto the stack and the stack pointer now equals the overflow pointer. The cache management hardware (shown in FIG. 4) inserts two cycles to handle the overflow as shown in FIGS. 5b and 5c, respectively. On the first overflow cycle (shown in FIG. 5b), the external overflow buffer pointer 46 is decremented and the overflow and underflow pointers are rotated one register clockwise. On the second cycle (shown in FIG. 5c), the element one register past the stack pointer is written into the external overflow buffer. The processor is now able to continue program execution.

Figure 6A:
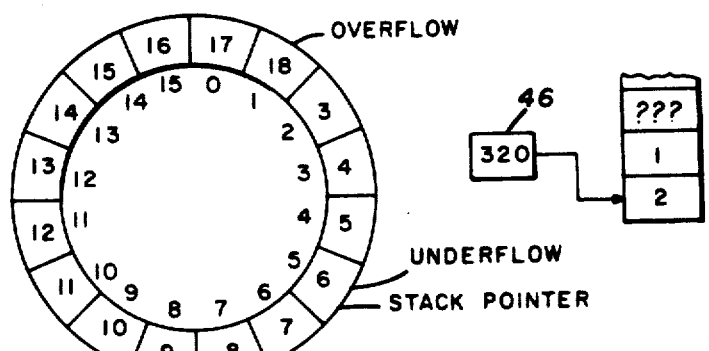
FIGS. 6a, 6b and 6c are diagrammatic views of the cache stack during underflow.
Figure 6B:
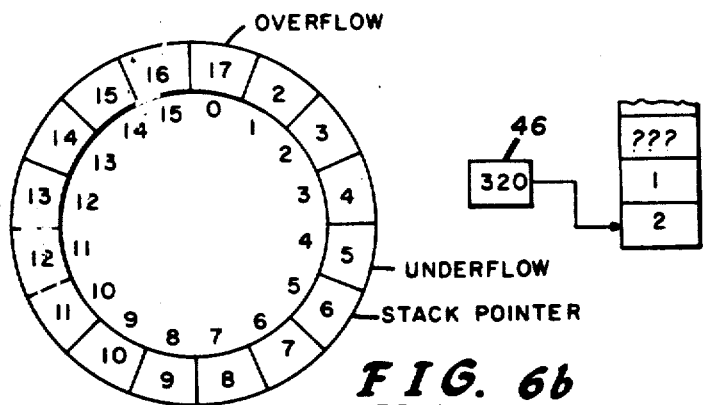
Figure 6C:
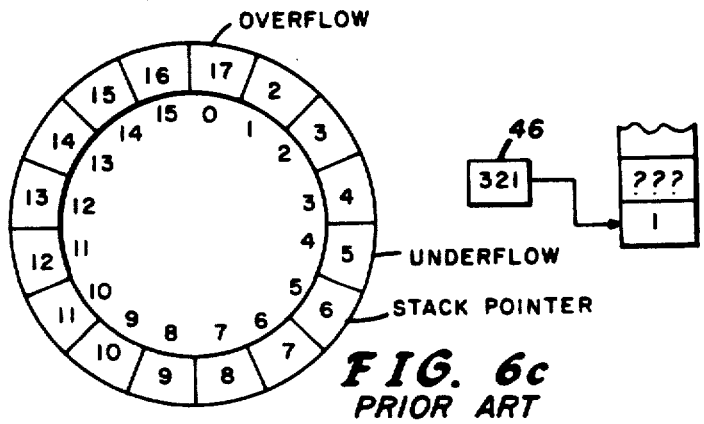
Figure 7:
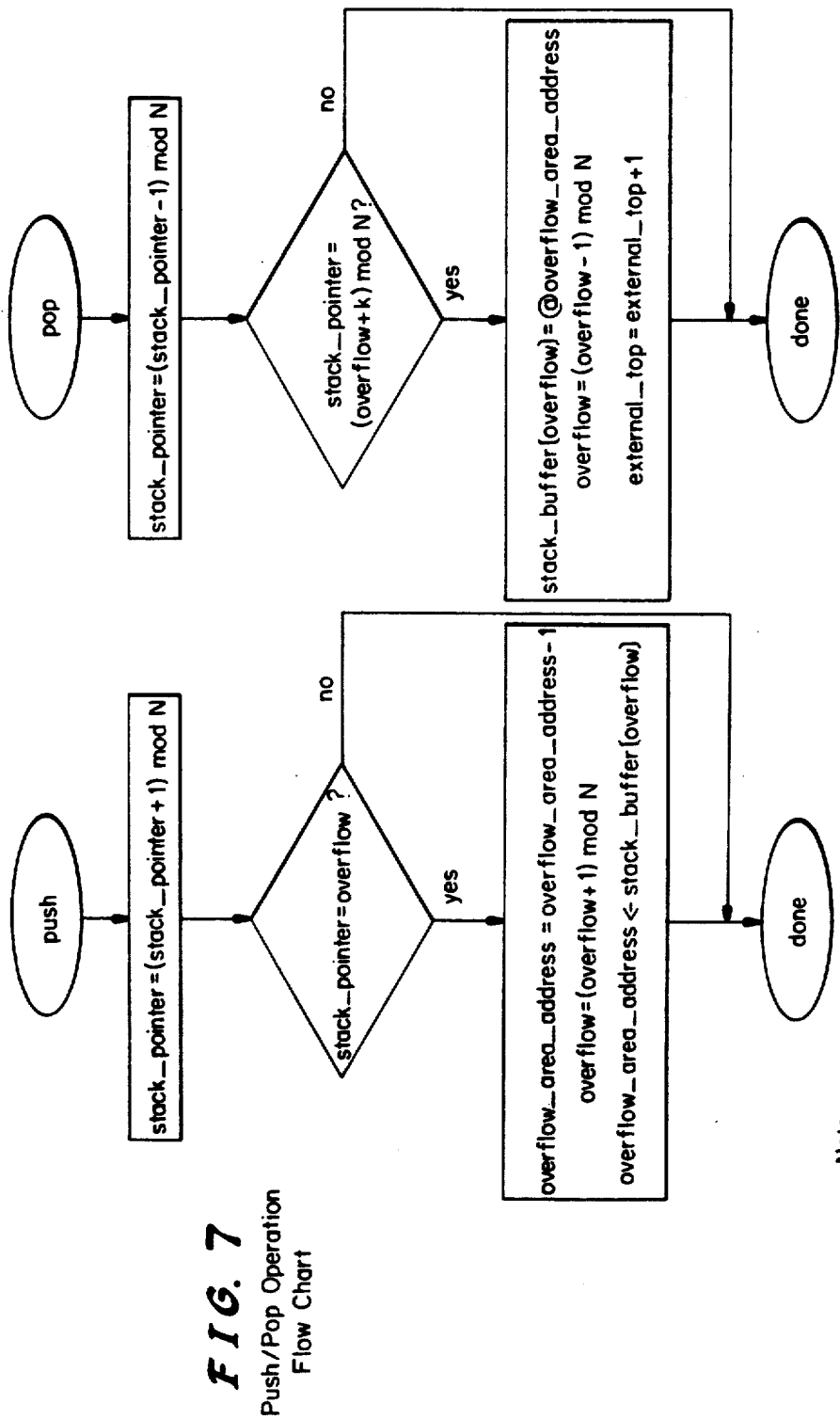
FIG. 7 is a flow chart which illustrates the combination of the elements for carrying out the preferred embodiment of the invention.

FIG. 6 illustrates the operation of the stack cache during an underflow condition. (It will be noted that the underflow pointer) is located four elements from the overflow pointer. The cache management hardware in this specific embodiment guarantees that at least the top four elements are always present in the register. This is accomplished by locating the pointers at appropriate distances, as noted in FIG. 6. Separation between overflow and underflow pointers is set to determine how much useful data is always on the chip cache. A separate circuit not shown, allows the processor to read from these four locations within the chip cache. It will, of course, be understood that this space could be changed to accommodate different software languages and the four spaces described above was only by way of example.) In FIG. 6a, the stack cache has underflowed causing the stack pointer to equal the underflow pointer. The cache management hardware (shown in FIG. 4), inserts two cycles to handle the underflow condition as shown in FIGS. 6b and 6C, respectively. On the first underflow cycle (see FIG. 6b), the value of the top of the external overflow buffer (the 2) is read into the stack cache four registers below the stack pointer. The overflow and underflow pointers are also rotated one register counter-clockwise. On the second underflow cycle (shown in FIG. 6c), the external overflow buffer pointer 46 is incremented and the processor is now able to continue program execution. The flow chart illustrated in FIG. 7 may be better understood by recognizing that in the chart as shown N is the size of the stack buffer; k is the number of values guaranteed to present in the stack cache at all times; stack buffer [0. . . N-1] is the stack cache; external _stack [] is the external stack, stack-pointer indicates the top of the stack in the stack cache, overflow indicates the stack cache's overflow mark, overflow_area_address is the address of the top of the stack in the external memory, and overflow_area_address is the contents of external memory location overflow_area_address.

Although the present invention has been described in terms of a specific embodiment with pointers moving in clockwise direction, it is to be understood that this was merely a convenience for description purposes. For instance, we described an embodiment where a push of data onto the stack buffer will increment the stack pointer and a pop of data from the stack buffer will decrement the stack pointer. The invention naturally would work equally well with a push of data onto the stack buffer decrementing the stack pointer and a pop of data from the stack buffer in incrementing the stack pointer. In addition, any number of stack caches could be used by a processor. Obviously, many such modifications and variations of the present invention are possible in light of the above teachings. It is, therefore, to be understood that within the scope of the appended claims, the invention may be practiced otherwise than is specifically described.

What is claimed is:

1. An information storage device, comprising:
    a stack buffer having a plurality of locations addressed by a stack pointer;
    an external overflow buffer having a plurality of locations addressed by an external overflow buffer pointer;
    a counter means for incrementing or decrementing the stack pointer, wherein a push of data on the stack buffer will rotate the stack pointer in one direction and a pop of data from the stack buffer will rotate the stack pointer in the other direction; and,
    a stack management hardware means for: (1) comparing the stack pointer with an overflow pointer and an underflow pointer to determine if underflow or overflow has occurred; (2) incrementing the overflow and underflow pointers by one, and writing into the external overflow buffer a single element stored in the stack buffer one location past the location addressed by the stack pointer, if overflow has occurred; (3) writing an element stored at the top of the external overflow buffer into the stack buffer at a location a set number of locations below the stack pointer, decrementing the overflow and underflow pointer one location and incrementing the external overflow buffer pointer, if underflow has occurred.

2. The device of claim 1, wherein said stack management hardware means, comprises:
    a means for comparing the stack pointer with the overflow and underflow pointers to determine if an overflow or underflow has occurred;
    a first counter means for incrementing the overflow pointer one location if an overflow has occurred and for decrementing the overflow pointer by one location if an underflow occurs;
    a second counter means for incrementing the external overflow buffer pointer by one location if an overflow has occurred and decrementing the external overflow buffer pointer by one location if the underflow has occurred;
    an adder means for adjusting the underflow pointer a set number of locations from the overflow pointers; and,
    an adder/subtracter means for calculating a stack location from the stack position to be read or written in overflow/underflow.

3. A device of claim 1, further comprising an integrated circuit chip on which a processor and said stack buffer are located, wherein a single address/data bus connects said chip to said overflow stack, and wherein the overflow stack is external to said chip.

* * * * *